United States Patent

[11] 3,571,581

| [72] | Inventors | Roger D. Kaus;<br>John A. Muehlenbein, Rochester, Minn. |
|---|---|---|
| [21] | Appl. No. | 758,873 |
| [22] | Filed | Sept. 10, 1968 |
| [45] | Patented | Mar. 23, 1971 |
| [73] | Assignee | International Business Machines Corporation<br>Armonk, N.Y. |

[54] DIGIT VERIFICATION SYSTEM FOR AN ELECTRONIC TRANSACTION RECORDER
17 Claims, 8 Drawing Figs.

[52] U.S. Cl. .................................................. 235/153,
235/61.7
[51] Int. Cl. ..................................................... G06f 11/08
[50] Field of Search.......................................... 235/153,
61.7; 340/146.1

[56] References Cited
UNITED STATES PATENTS

| 3,235,716 | 2/1966 | Porter et al. .................. | 235/153 |
| 3,484,744 | 12/1969 | Gertler et al.................. | 235/153X |
| 3,384,902 | 5/1968 | Schroder et al............... | 235/153 |

*Primary Examiner*—Malcolm A. Morrison
*Assistant Examiner*—Charles E. Atkinson
*Attorney*—Sughrue, Rothwell, Mion, Zinn and MacPeak ABSTRACT: A number entered into an electronic transaction recorder is verified for accuracy in accordance with a mathematical prescription or predetermined mathematical rules. The numbers entered are assumed to be preassigned numbers which conform to a prescribed and predetermined rule of composition. If a number was incorrectly entered, an indication is provided that an error was made in the entry. By including a programming means within the verification apparatus, the system is flexible with regard to the length of the numbers to be checked and the keyboard position of the numbers to be checked.

INVENTORS
ROGER D. KAUS
JOHN A. MUEHLENBEIN

DIGIT VERIFICATION SYSTEM FOR AN ELECTRONIC TRANSACTION RECORDER

BACKGROUND OF THE INVENTION

The invention is in the field of key entry verification apparatus.

The entry of numerical data into a machine by an operator, such as on a keyboard, is a common occurrence in connection with many different types of machines. An electronic machine for recording and storing a record of business transactions is a typical example. The keyed-in numbers may represent numerous factors such as, a credit card number, department number, stock item number, sales amount. For the preassigned numbers a check can be made on their accuracy provided the preassigned numbers conform to a prescribed rule of composition. Of course, sales amounts are not checked. Many prescribed rules of composition are known in the art. For a given prescribed rule of composition, there is a given mathematical prescription which, when the entered number is subjected to the mathematical prescription, a common result will occur no matter what the number, provided of course the number correctly conforms to the original rule of composition. It is very important to check the preassigned numbers as soon as they are entered into the machine. If the numbers are entered incorrectly, errors such as charging a transaction to the wrong customer or crediting a transaction to the wrong department may result.

It is known in the prior art to provide electronic verification for keyed-in numerical data whereby the operator can be informed almost immediately that a keyed-in error exists. One basic format or set of rules of such a prior art verification technique is:

numerically weigh each digit of the keyed-in number according to its order within the total number and according to a preassigned statistical formula;

Multiply the number keyed into each keyboard column by an assigned column weight; sum the digits of all the products and check the final summation for $y$ mod $x$.

If the remainder mod $x$ is equal to $y$, then the entry was accurate. If the remainder mod $x$ is not equal to $y$, then the entry was in error.

As one specific example of the format of a transaction verification apparatus, consider a transaction recorded having a keyboard entry. The device is used in a department store and the keyboard operator keys in a 9 digit credit card number on a 9 column field of the keyboard reserved for a credit card number. The 9 column field is checked by the prior art verification apparatus to determine its authenticity. It should be noted at the outset that the verification of data fields requires that the preassigned numbers be assigned in accordance with certain rules so that when the keyboard entry is mathematically operated upon, it will give one result if it is a correct number and a different result if it is incorrect. In the example discussed herein, it can be assumed that each valid credit card number satisfies the statement, $$\sum_{i=1}^{9} (a_i + b_i) = 0 \mod 10$$

where $a_i$ is the 10's digit and $b_i$ is the 1's digit of the product obtained when a fixed weighting factor, $w_i$, is multiplied by the digit $d_i$ which is the digit of the number in the $i$th column. Using a system by which the weighting factors are alternately 1 and 2, the above formula can be summarized as follows:

Starting from the right in the credit card number, multiply every other digit by 1 and multiply the alternate digits by 2. Sum the digits of the products and divide by 10. If the modulus 10 divides evenly into the sum then the credit card number is valid, otherwise it is invalid.

In the prior art systems which carry out this type of operation, the weighting factors are preassigned to special key columns of the field of the keyboard. Considering the above example, of the 9 column card entry field, columns 1, 3, 5, 7 and 9 are weighted times one, and columns 2, 4, 6, and 8 are weighted times two. In such a system, there is no flexibility. Since the weights are preassigned to the columns, the number must be correctly entered into the corresponding weighted columns.

With preassigned column weights applied to each keyboard column, a verification apparatus will have to be separately designed for each different use of a keyed-in operated machine. Also, such a verification apparatus can only be operative with a particular keyboard length for which it was assigned. Whereas one business unit may require verification of a 2-digit department field and a 5-digit stock item field, another may require verification of a 3-digit department field and a 6-digit stock item field. Also, one business unit may require key entry of fields A, B, and C, with verification of fields A and B only, while another business may require entry of fields A, B, and C, with verification of fields A and C only. (In this example, the fields A, B, and C represent the sequentially positioned groups of columns of entries on a keyboard). The prior art verification apparatus, in which each keyboard column is inflexibly assigned a numerical weight, has no adaptability to the multiple functions that a keyboard entry machine must perform.

SUMMARY OF THE INVENTION

In accordance with the present invention, substantial flexibility in electronic verification systems is provided both in the selection of the keyboard entry format and in a choice of the modulo operation. Thus, for example, a keyboard with 13 columns of keys numbered 1 through 13 from right to left may receive data information and stock item information on keys 9 through 12 and 6 through 7, respectively or on keys 9 through 13 and 6 through 8, respectively, and still be verified by the same electronic apparatus. In operation, a counter provides a sequencing signal or count inputs to a programming means which selects the columns on the keyboard which contain digits of the number to be verified, and also selects the order in which those columns are scanned. This selection by the programming matrix has the affect of assigning weights to the columns because a weighting apparatus operates upon the digits entered into the columns in accordance with the order in which they are scanned. The scanned digits are properly weighted and summed in an arithmetic means. Following a full scan of all selected columns, the final sum is checked for $y$ mod $x$. In the specific example described herein, the system checks for 0 mod 10 and 0 mod 11.

DETAILED DESCRIPTION OF THE INVENTION

Figure 1:
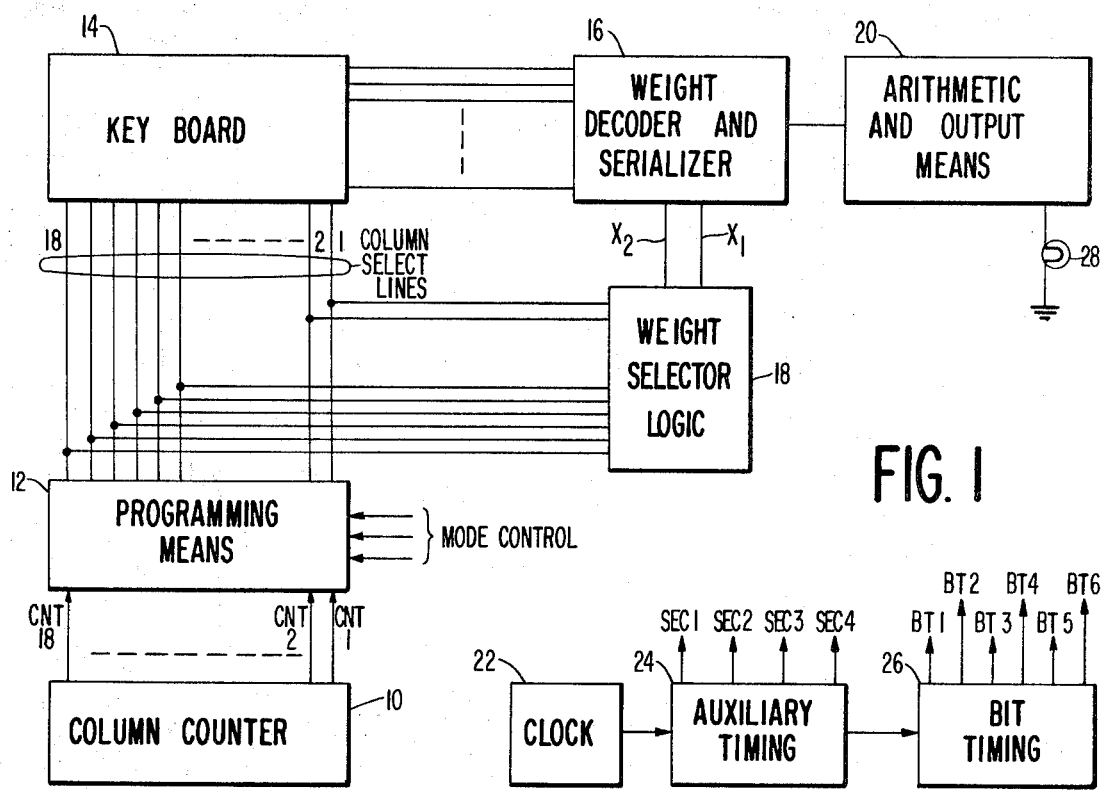
FIG. 1 is a broad block diagram of a preferred embodiment of the present invention.

As mentioned above, vertical techniques and mathematical prescriptions for verifying numbers which conform to predetermined rules are well known in the art. Generally, a mathematical prescription for operating upon the numbers is selected in accordance with its error checking capabilities. Once the prescription is selected almost any given number having a plurality of digits can be conformed to the rules necessary to comply with the selected mathematical prescription by merely changing one of the digits, referred to as the check digit, of the number. In order to provide a specific example of applicant's invention the apparatus will be described in connection with two specific mathematical prescriptions. It should be noted, however, that the mathematical prescriptions themselves are not new but the apparatus and mode of carrying out the mathematical prescription, the flexibility achieved by the programming means, and the flexibility achieved by providing a single system which can perform two mathematical prescription verification techniques are new In order to fully understand the specific embodiments described herein, it is necessary to have a general understanding of the two sets of verification rules or mathematical prescriptions which are performed by the specific embodiment. These two operations are referred to as the mod 10 operation and the mod 11 operation. Both are well known in the art and are described partially herein only to provide the reader with some background information.

MOD 10 OPERATION

For mod 10 operation the digits of the number to be checked are weighted 1, 2, 1, 2, 1, etc., with the check digit always being weighted by the value 1.

It is evident from a consideration of accompanying Table I which shows numerical values to be accumulated for each of key values zero through nine when weighted unity, and when weighted with value 2,

TABLE I

| Key value: | Accumulation, weight value 1 | Accumulation, weight value 2 | Accumulation, least significant digit, weight value 2 |
|---|---|---|---|
| 0 | 0 | 0 | 0 |
| 1 | 1 | 2 | 2 |
| 2 | 2 | 4 | 4 |
| 3 | 3 | 6 | 6 |
| 4 | 4 | 8 | 8 |
| 5 | 5 | 10 | 0 |
| 6 | 6 | 12 | 2 |
| 7 | 7 | 14 | 4 |
| 8 | 8 | 16 | 6 |
| 9 | 9 | 18 | 8 | that, if the accumulation is to be periodically by modulus 10 as prescribed by the rule, it is meaningless in accumulating the doubly weighted values to add into the accumulation any but the lowest significant order digits of those products greater than 9. For example, in accumulating the product of key value 6 multiplied by weight value 2 (product = 12) and division by modulus 10, the only significant addition is the digit 2. Similarly, in the case of doubly weighted key value 7, the product 14 could as well be presented in the accumulator by only the least significant digit, 4. And since only the least significant digit of the product produced when a key value is doubly weighted is of consequence, it may be noted that there is a possibility of the machine confusing, and hence not detecting (for example) depression of a doubly weighted key 7 for depression of a doubly weighted key 2. Hence the apparatus of the invention is so arranged that weighting is according to Table II, wherein it will be noted that the products of the key values and their respective weights will be added according to modulo 9.

TABLE II

| Key value: | Accumulation, weight value 1 | Accumulation, weight value 2 |
|---|---|---|
| 0 | 0 | 0 |
| 1 | 1 | 2 |
| 2 | 2 | 4 |
| 3 | 3 | 6 |
| 4 | 4 | 8 |
| 5 | 5 | 1+0=1 (10−9) |
| 6 | 6 | 1+2=3 (12−9) |
| 7 | 7 | 1+4=5 (14−9) |
| 8 | 8 | 1+6=7 (16−9) |
| 9 | 9 | 1+8=9 (18−9) |

In Table II, it will be noted that by this expedient each value presented to the accumulator as a result of depression of a doubly-weighted key is a unique value insofar as doubly-weighted keys are concerned. That is, the value presented to the accumulator is different for each of the 10 keys of a key column, being, respectively, 0, 2, 4, 6, 8, 1, 3, 5, 7, and 9. As indicated, the accumulator accumulations for each doubly-weighted key of value 5 and greater is thus 1 in excess of the required accumulation for simple products of key value times weight; and to correct the discrepancy, the check digit (which is by design always singly-weighted) is calculated to correct the excess.

Thus, the rules for mod 10 operation are:
  1. Multiply the digit times the column weight;
  2. If the product is less than 10, accumulate the product;
  3. If the product is 10 or greater, add one to the product and accumulate the low order digit of the resulting sum;
  4. After all weighted digits have been accumulated as provided in Rules 1 through 3 above, divide by 10–if the remainder is zero the number is verified.

In accordance with a special feature of the present invention, a decoding logic means responds to the digit selected and the weighting factor to directly decode the selected digit into the proper accumulation input as indicated by Table II above. For mod 10 operation this direct decoding avoids successive additions when weights greater than 1 are used, and also avoids the need for special apparatus to separately carry out the addition of a one value as indicated in Rule 3 above. Rules 1, 2 and 3 above are carried out in a one-step process by the decoding logic means.

The accumulation is carried out only on a 4-bit summation. That is, only 4 bits are accumulated in the output register, providing a maximum output total of 16 (1111). Each time the accumulated sum goes to 16 or above, which is more than the capacity of the output register, the decimal number 10 (binary number 1010) is effectively subtracted from the accumulated sum by dropping the carryover bit and adding the number 6 (0110) to the sum in the output register. Dropping the carryover bit, which in binary addition indicates the number 16, is equivalent to subtracting 16 from the accumulated sum. Thus, by adding 6 to the accumulated sum the system, in effect, subtracts 10 from the accumulated sum. Note that since verification depends upon the final sum being evenly divisible by the number 10, the system can continuously subtract 10 from the sum without it having any effect on the accuracy of the operation.

MOD 11 OPERATION

For mod 11 operation, the column weights vary from 1 to 7 in sequence in the order in which the columns are selected, starting with the check digit. Only the check digit is weighted 1 and the columns following the seventh will be weighted starting with weight 2. The rules for mod 11 operation are as follows:
  1. Multiply each digit by its associated column weight;
  2. Accumulate the products of the multiplications;
  3. After all digits have been operated upon in accordance with Rules 1 and 2, divide the accumulated sum by 11–if the remainder is 0, the number is verified.

The above rules are effectively out using only 4-bit binary accumulation. Since the accumulation is checked for its even divisibility by 11, the subtraction of 11 at any time has no effect on the outcome. A 4-bit number represents in decimal form any number from 0 to 15. Following the accumulation of each digit, there will be a carryover from the highest order bit position whenever the accumulated sum is 16 or greater. By ignoring this carryover the number 16 is effectively subtracted from the total sum. However, by adding the number 5 to the sum at this time the system effectively subtracts the number 11 (+5 − 16 = 11) from the sum and maintains a 4-bit accumulation throughout the accumulation operation. The logic for carrying out the weighting operation adds each selected digit to the accumulated sum a number of times dependent upon the weighting factor.

Figure 2:
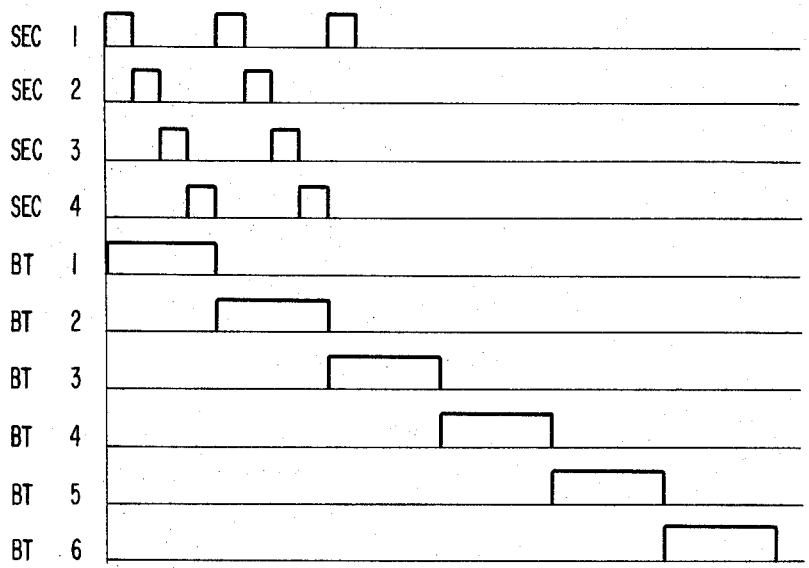
FIG. 2 is a pulse waveform diagram illustrating the timing relationship of the timing or clock pulses used to control the verification apparatus of the present invention.

FIG. 1 is a general block diagram of a preferred embodiment of the present invention and includes a column counter 10, a programming means 12, a keyboard entry storage means 14, a weight decoder and serializer 16, a weight selector logic 18, an arithmetic and output means 20, and an error indication lamp 28. The timing sequence of the verification apparatus is controlled by timing means which comprises a clock pulse generator 22, an auxiliary timing circuit 24, and a bit timing circuit 26. The clock pulse generator 22 provides output clock pulses to the auxiliary timing circuit 24 which provides the outputs SEC1 through SEC4 in sequence. After receiving 4 clock pulses, the auxiliary timing circuit 24 recycles and also provides an input pulse to the bit timing circuit 26. In response to input pulses applied thereto the bit timing circuit provides the outputs BT1 through BT6 in sequence and recycles after bit time BT6. The bit timing pulses from bit timing circuit 26 provide the basic timing control for the system logic, and the SEC pulses divide each bit timing pulse into 4 different phases. The timing relationship of the SEC pulses and bit timing pulses is illustrated by the pulse waveform diagram in FIG. 2.

The operation of the verification apparatus shown in FIG. 1 is generally as follows:

An operator enters a number, which includes the number to be verified, into the keyboard means 14. Each digit of the number is entered into a separate column and a particular column into which the number is entered depends upon a format of machine use. The keyboard 14 is assumed to have 18 columns of keys, each column including digit keys 1 through 9. The columns are also numbered 1 through 18 from right to left. Sequencing of a system is controlled by the column counter 10 which provides the outputs CNT1 through CNT18 in sequence. The column counter 10 is advanced by means to be described more fully hereafter in connection with FIG. 8. The sequencing inputs CNT1 through CNT18 are applied to the programming means 12 which in turn provides the outputs column select 1 through column select 18. The column select outputs are connected to the keyboard and storage means 14 such that the digit entered into the keyboard column corresponding to the energized column select line input is set to the weight decoder and serializer 16. Thus, the order of occurrence and the fact of occurrence of the column select outputs from the program means 12 determines the order in which the keyboard columns are scanned.

Each time a keyboard column is scanned, its corresponding digit entry is transferred to the weight decoder and serializer 16. It should be noted that the output lines of the programming means 12 are not necessarily, and in most cases definitely are not energized in the same sequence as the programming means input lines. The programming means, to be described more fully in connection with FIGS. 3 and 4, includes logic hardware in combination with replaceable programming interconnection means. The programming interconnection means, which may be a plurality of jumper wires arranged in accordance with a certain pattern, or an etched card having interconnections etched thereon in accordance with said certain pattern, effectively connects selected ones of the CNT inputs to selected ones of the column select outputs. Thus, for example, when CNT1 occurs column select 2 may be energized; when CNT2 occurs no output is energized, when CNT3 occurs column select 16 is energized. The latter sequence is given only to illustrate the wide degree of control which is provided by the programming means 12. The programming means 12 also responds to mode control inputs which provide variations within a single program. Thus, for a given program inserted in the programming means 12 different mode control inputs result in different correspondence between the CNT input lines and the column select output lines.

Each of the column select lines, when energized, provide an input pulse to the weight selector logic 18. The weight selector logic provides weighting control signals to the weight decoder and serializer 16. The weight decoder and serializer 16, as mentioned previously, receives the digit in the selected column from keyboard 14. For mod 10 operation, the weight selector logic 18 provides the output $x1$ and $x2$ alternately to the weight decoder and serializer 16. Each column select input to the weight selector logic 18 alternates the output therefrom. The weight decoder and serializer 16 is divided basically into a $x1$ section and a $x2$ section. In response to the $x1$ output from weight selector logic 18, the $x1$ section of weight decoder 16 is energized to convert the input digit from the selected keyboard column into a 4-bit binary number. The number is serialized and sent to an arithmetic and output means 20 wherein it is accumulated. In response to an $x2$ output from the weight selector logic 18, the $x2$ section converts the input digit from the selected keyboard column into a 4-bit number corresponding to that indicated in column 3 of Table II above.

For mod 11 operation, the columns, in the order in which they are selected, are weighted 1 through 7, 2, through 7, etc. Thus for mod 11 operation the weight selector logic 18 accumulates the column select inputs in a weight select counter which recycles to a count of 2 following a count of 7. Thus, the weight select counter will contain the weight to be given to the digit in the selected column. The $x1$ output is energized continuously during the mod 11 operation and the $x2$ output is always deenergized. Thus, each decimal digit into the weight decoder and serializer 16 is directly decoded into a corresponding 4-bit binary number which is applied in series to the arithmetic and output means 20. However, unlike the mod 10 operation, during mod 11 operation the 4-bit binary output from the weight decoder and serializer is added to the arithmetic and output means 20 a plurality of times equal to the weight stored in the weight select counter. Thus, the weight select counter controls the number of cycles of addition for each selected column resulting in the effective multiplication of the selected column digit by the assigned weight.

The arithmetic and output means 20 operates to accumulate the 4-bit binary numbers applied thereto and to store the accumulated sum in a 4-bit register. Correction is provided within the arithmetic and output means 20 whenever the accumulated sum tends to go above the decimal value 15. Correction is made during mod 10 operation by effectively subtracting the decimal value 10; and correction is made during mod 11 operation by effectively subtracting the decimal value 11. After the digit within the last column to be selected has been weighted and accumulated in the arithmetic and output means 20, the final accumulation is checked for even divisibility by 10 (mod 10 operation) or 11 (mod 11 operation). If the final accumulation is not evenly divisible then the output error means such as lamp 28 is energized.

PROGRAMMING MEANS

The purpose of providing a programming means is to enable the verification system to be flexible. The programming means functions to select which of the keyboard columns are to be scanned and the order in which they are to be scanned. The remaining portion of the verification system weights and sums the digits entered therein in the order received and remains ignorant of the relationship of the position of the keyboard columns and the order in which they are scanned. However, to provide a verification system which can verify numbers of varying width and varying keyboard positions a programming means is necessary. In the programming means to be described herein not only do different inserted programs provide flexibility, but there are control inputs to the programming means which provide flexibility within a single fixed program.

There are two types of programming means which may be used in the present invention. The first uses 2 program matrices and requires one column gate (AND gate) per keyboard column. The second uses one program matrix and requires one column gate per keyboard column per mode The latter type of programming means has greater flexibility but a significantly greater amount of hardware is necessary.

Figure 3:
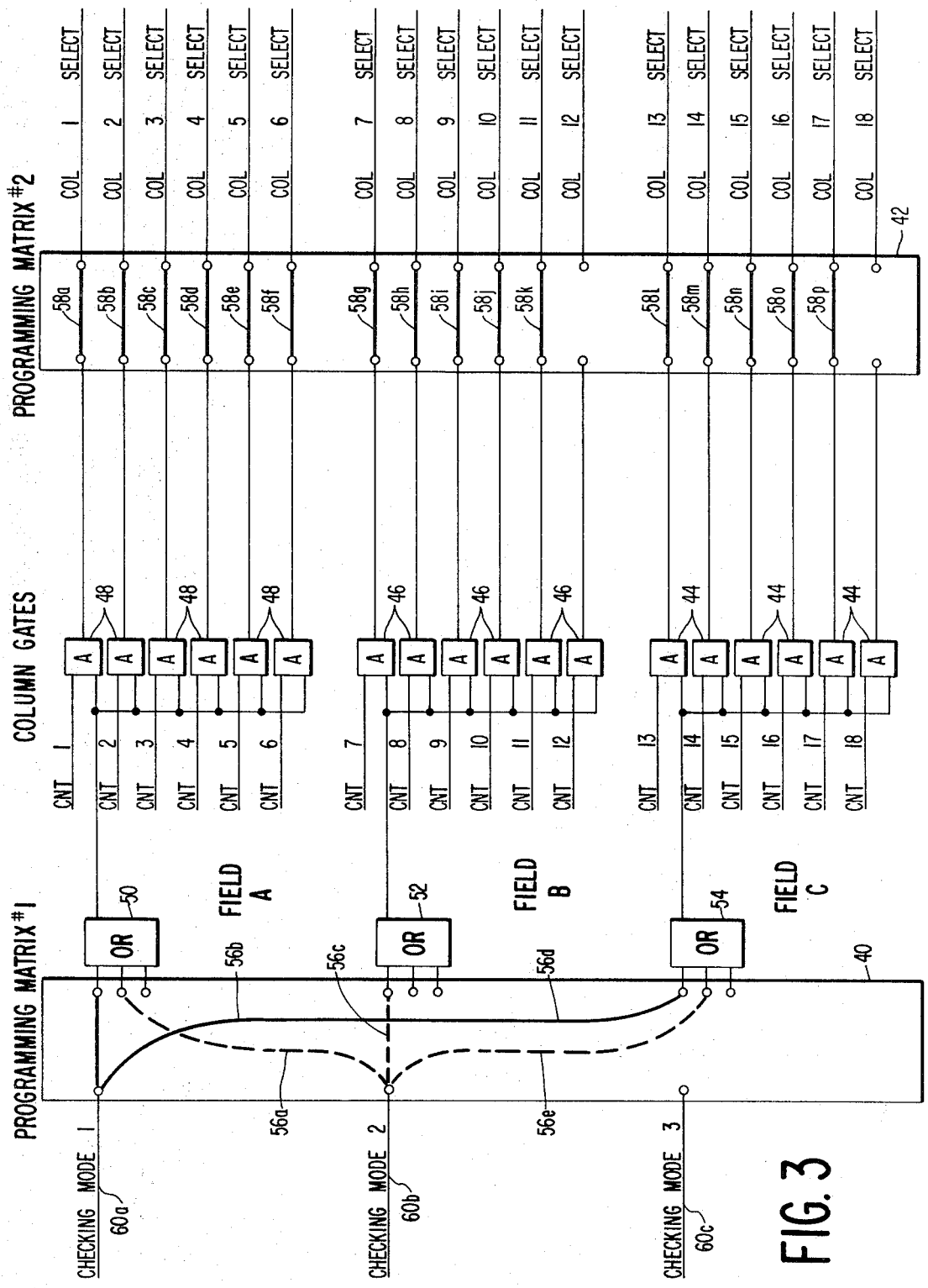
FIG. 3 illustrates an example of a programming means in accordance with the present invention which uses two program matrices.

The 2-matrix type of programming means is illustrated in FIG. 3 and comprises a first programming matrix 40, a second programming matrix 42, a plurality of column gates (AND gates) 44, 46 and 48, one for each column, and a number of OR gates 50, 52 and 54. The replaceable programming device within the programming matrices controls the electrical interconnections between the input terminals and output terminals of the programming matrices. As indicated in FIG. 3, the replaceable programming device is a set of jumper wires 56a through 56d in the first programming matrix 40 and a set of jumper wires 58a through 58p in the second programming matrix 42. It will be apparent to anyone of ordinary skill in the art that other types of replaceable programming devices may be used instead of the jumper wires illustrated in FIG. 3. As one additional example, etched cards in which the electrical interconnections between input terminals and output terminals are etched thereon may be used.

The keyboard columns are divided into three fields, A, B, and C, by programming means of FIG. 3. As illustrated in the drawing, field A corresponds to keyboard columns 1 through 6, field B corresponds to column 7 through 12, and field C corresponds to columns 13 through 18. The first programming matrix 40 determines which fields are to be scanned during the modes 1, 2, and 3. Note that the modes are controlled by mode inputs being applied on the checking mode input lines 60a through 60c. For the specific programming device 56, the fields A and C will be scanned in response to a mode 1 input on line 60a, and the fields A, B, and C will be scanned in response to a mode 2 input on line 60b. There is no mode 3 operation illustrated.

There are 18 column gates, each of which is partially energized by a corresponding CNT input from the column counter 10 (FIG. 1). The column gate outputs are connected to the column select lines via the second programming matrix 42. The second programming matrix, by means of the program device 58, selects the columns within the fields to be scanned and the order in which they are scanned. For example, in response to a mode 1 input on line 60a, the order in which the keyboard columns are scanned is as follows:

1, 2, 3, 4, 5, 6, 13, 14, 15, 16, 17.

It should be noted that for a given programming device within the two matrix type of programming means, the order in which the columns are scanned, within a given field, will be the same for each of the three modes.

Figure 4:
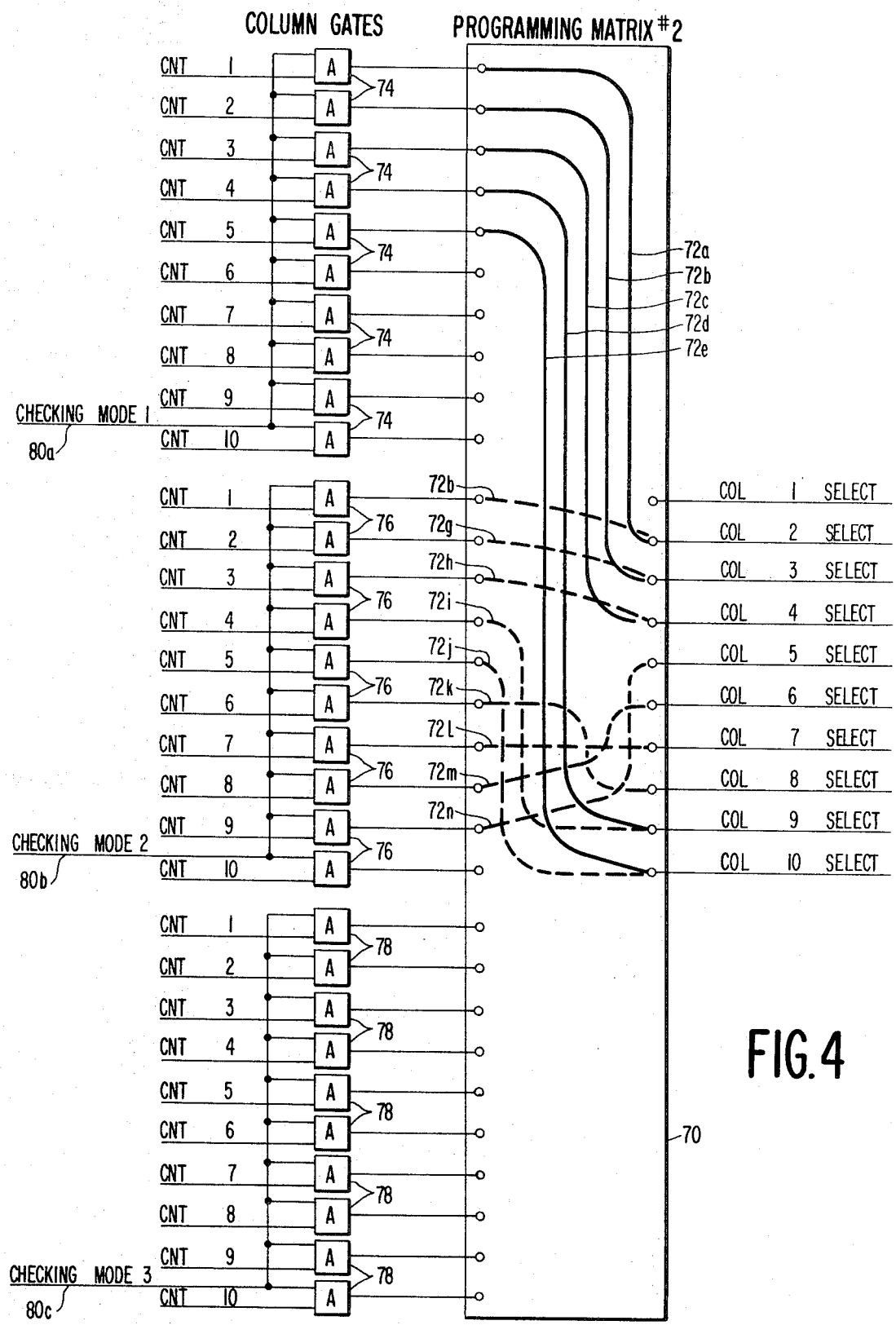
FIG. 4 illustrates an example of a programming means in accordance with the present invention which uses a single programmatrix.

The single matrix type of programming means is illustrated in FIG. 4 and is shown only for a 10-column keyboard for the purpose of simplifying the drawing although it will be apparent to anyone of ordinary skill in the art that the idea extends to an 18 or any number column keyboard. Instead of providing a separate matrix for selecting the fields to be scanned within each mode, the second approach provides a separate group of column gates for each mode, each group containing 10 column gates. The programming means comprises a first group of 10 column gates 74, a second group of column gates 76, a third group of 10 column gates 78, a programming matrix 70, provided with a programming device such as jumper wires 72a through 72n. Each group of column gates is controlled by one of the mode inputs on input lines 80a through 80c. For a given group of column gates, the individual column gates are energized in sequence by the CNT output of the column counter (FIG. 1).

The programming means of FIG. 4 provides greater flexibility than that of FIG. 3 because for a given programming device (etched card or set of fixed jumper wires) the order of scanning the columns can vary from mode to mode. For the program indicated in the drawing the columns are scanned in the following order reading from right to left:

| Mode 1 | | | | | | | | | | | |
|---|---|---|---|---|---|---|---|---|---|---|---|
| 10 | 9 | 8 | 7 | 6 | 5 | 4 | 3 | 2 | 1 | | CNT output. |
| - | - | - | - | - | 10 | 9 | 4 | 3 | 2 | | Column scanned. |

| Mode 2 | | | | | | | | | | | |
|---|---|---|---|---|---|---|---|---|---|---|---|
| 10 | 9 | 8 | 7 | 6 | 5 | 4 | 3 | 2 | 1 | | CNT output. |
| - | 5 | 6 | 7 | 8 | 10 | 9 | 4 | 3 | 2 | | Column scanned. |

Thus, it can be seen that the arithmetic verification operation can be performed on a wide variety of fields of numbers with only a single electronic package. For different fields of numbers to be entered into different positions on the keyboard, one merely selects a proper program device (etched card or set of jumper wires) so that the number to be verified is properly scanned irrespective of its keyboard position.

DESCRIPTION OF THE SYSTEM LOGIC

The details of the system logic will now be described in connection with FIGS. 5, 6, 7, and 8. The logic is broken up into four figures only because of the limited amount of space on the sheets of drawing, but it will be apparent from the logical input and output lines bearing the same signals that the figures are all interconnected.

Figure 5:
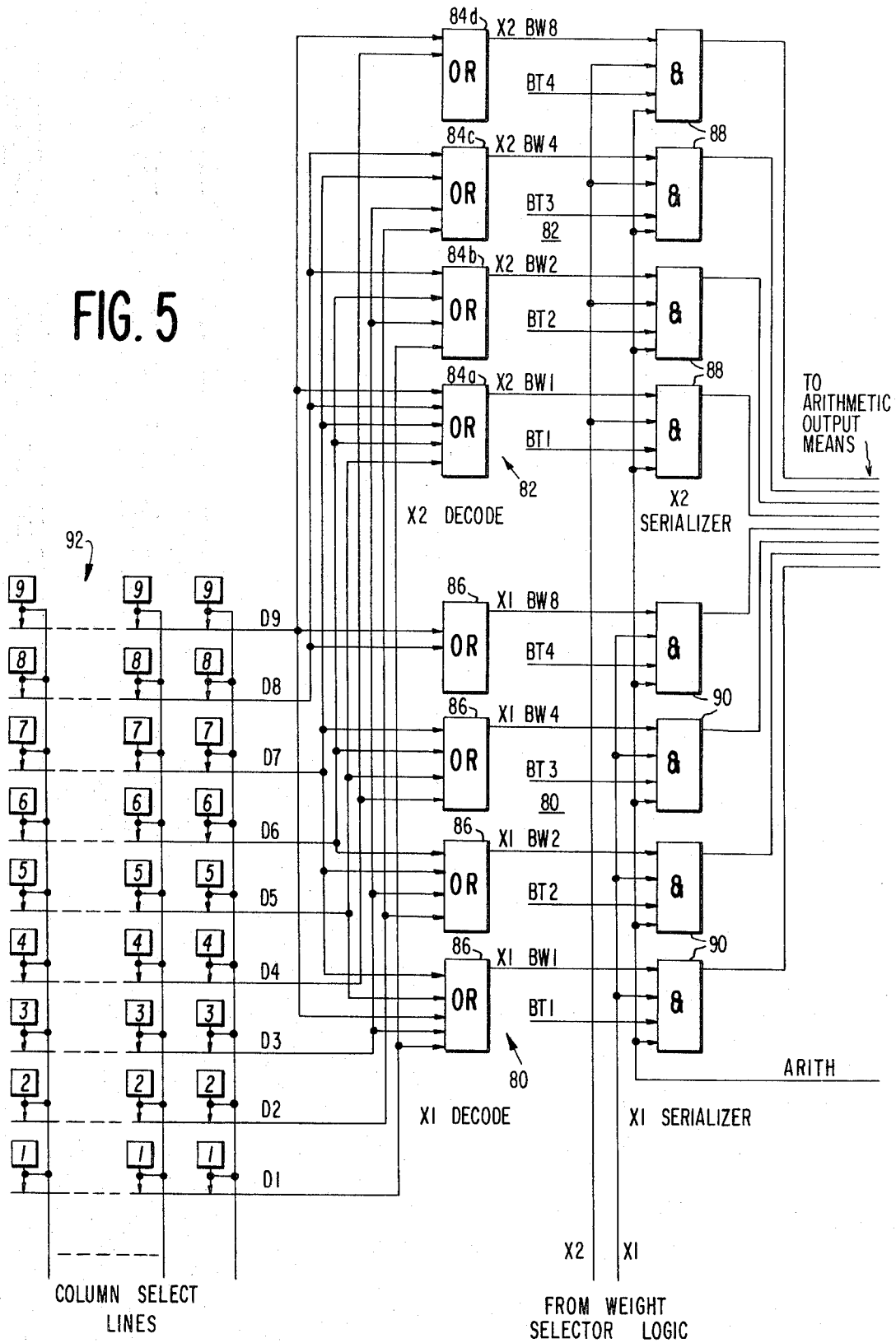
FIGS. 5, 6, 7 and 8 are detailed logic diagrams of the apparatus shown broadly in FIG. 1.

FIG. 5 shows details of the keyboard and storage means 14 and the weight decoder and serializer 16. The keyboard apparatus and storage means is shown generally at 92 and comprises 18 columns of keys, each column having keys 1 through 9. Many known types of keyboards may be used in conjunction with the present invention. For example, the information can be stored in a memory-type keyboard or in latch banks which contain the information in decimal or binary coded decimal form from a self-restoring type of keyboard. In a memory-type keyboard, the information is retained until a restore signal is applied. A self-restoring type keyboard is one in which a key automatically restores when the operator releases the key. As shown at 92 in FIG. 5, a depressed key connects a column select input line to one of the digit output lines D1 through D9. Storage is provided for numbers entered into the keyboard until the keyboard is cleared and made ready for the next entry. The digit output lines D1 through D9 are connected as shown to the $x1$ section 80 and the $x2$ section 82. The $x1$ section 80 comprises four OR gates 86 and four AND gates 90. The $x2$ section includes four OR gates 84 and four AND gates 88. The digit input lines are connected to the OR gates 84 such that the energization of any one of the digit lines results in the corresponding digit being properly weighted in accordance with column 3 of Table II above, and converted into a 4-bit binary number at the outputs of the four OR gates 84. For example, referring to Table II above it is seen that for a key value of 7 and a weight value of 2, the resultant output should be equal to the decimal value of 5. Referring to FIG. 5, it is seen that the input digit line D7 is connected to OR gates 84a and 84c to provide the output 0101, which is the 4-bit binary equivalent of the decimal value 5.

Connections are made to the OR gates 86 of the $x1$ section 80 such that the digit input is directly coded into a 4-bit binary number. The 4-bit binary output from OR gates 84 is applied respectively to AND gates 88 within the $x2$ section 82. The AND gates 88 operate to serialize the 4-bit binary input thereto provided the system is in the ARITH mode and receives an ARITH input, and also provided that the $x2$ input line is energized. When the latter conditions occur, the bit timing pulses $Bt1$ through $Bt4$ sequentially energize AND gates 88 to serially pass, lowest order first, the 4-bit binary outputs from OR gates 84 to the arithmetic and output means.

When the output line $x1$ from the weight selector logic is energized, the AND gates 88 are inoperative and the AND gates 90 are operative. The latter AND gates operate to serialize the 4-bit binary number which appears at the outputs of the OR gates 86. Thus, it is seen that each time a column is selected by an energized column select line, the digit keyed into that selected column is operated upon in accordance with the control inputs from the weight selector logic to provide a 4-bit binary number that is serially entered into the arithmetic and output means. As will be described in more detail hereafter, during the mod 10 operation the x1 and x2 lines are alternately energized in response to each column select input, whereas during the mod 11 operation the x1 line remains energized and the x2 line remains deenergized.

Figure 6:
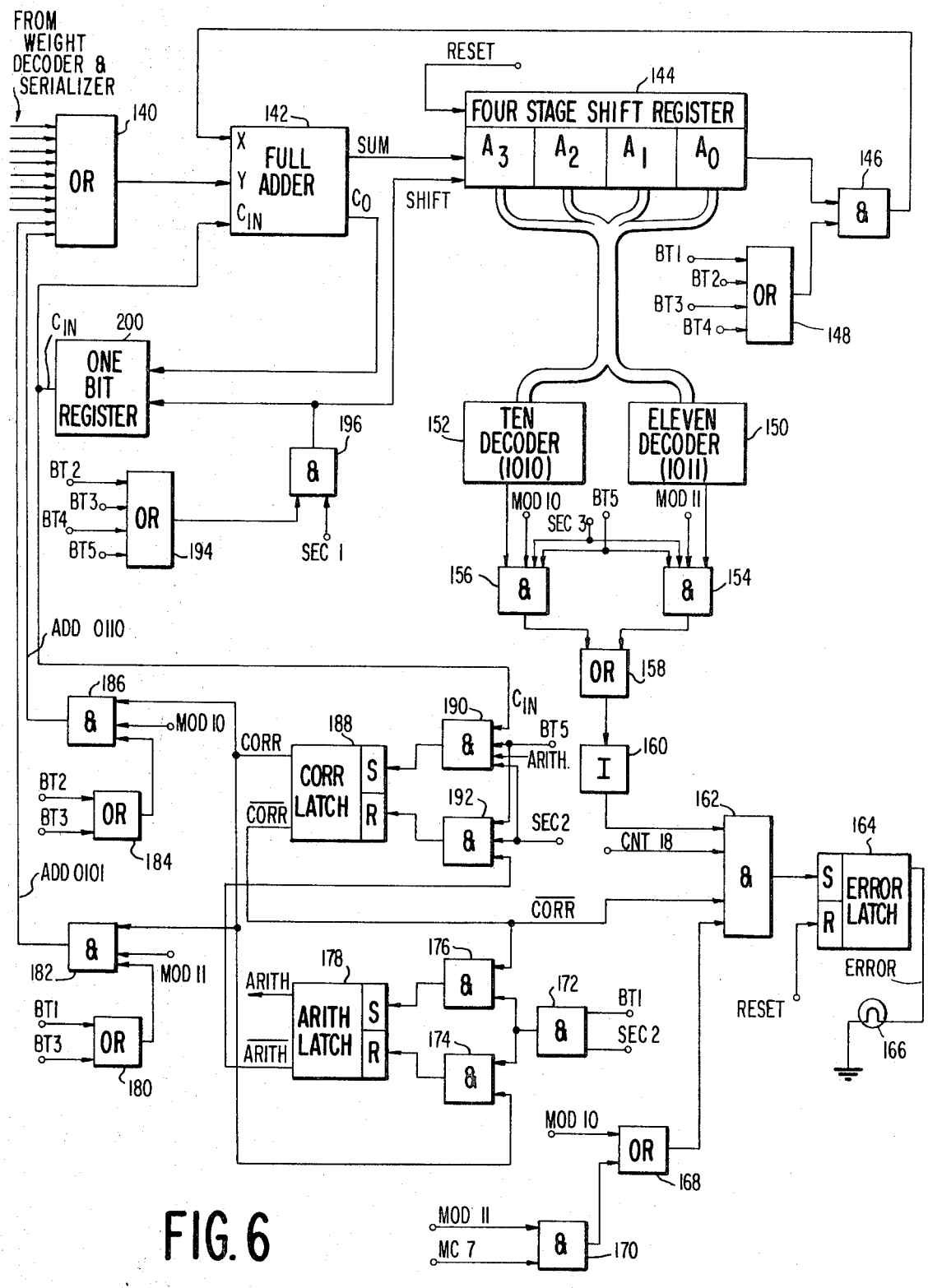

The logic details of the arithmetic and output means 20 (FIG. 1) is shown in FIG. 6. The 4-bit binary inputs from the weight decoder and serializer (FIG. 5) are applied through OR gate 140 to the Y input of a full adder 142. The sum digit output from full adder 142 is applied to a 4-stage shift register 144 which serves as the accumulation register. The output from the last stage of the 4-stage shift register 144 is applied to the X input of full adder 142 via an AND gate 146. The times at which the sum digits from full adder 142 are shifted into the accumulation shift register 144 are controlled by OR gate 194 and AND gate 196. The latter two gates also control the times at which a carryover output $c_0$ from the full adder 142 is entered into a 1-bit register 200. The bit stored in the 1-bit register 200 is applied to the carry-in input of the full adder 142. The times at which the contents of the last stage of the accumulation register 144 is entered into the X input of the full adder 142 is under control of the OR gate 148.

The $C_{in}$ bit from the 1-bit register 200 is applied to correction logic circuitry which includes AND gates 174, 176, 182, 186, 190, and 192, OR gates 180 and 184, CORRECT latch 188, and ARITH latch 178. The outputs from the correction logic circuitry which are taken from AND gates 182 and 186 are applied via the OR gate 140 to the Y input terminal of the full adder 142.

The total contents of the accumulation shift register 144 is applied to a ten decoder 152 and an 11 decoder 150. The 10 decoder 152 provides an output if the 4-bit binary number stored in the accumulation register 144 corresponds to the decimal value 10. The 11 decoder 150 provides an output if the 4-bit binary numbers stored in the accumulation register 144 corresponds to the decimal number 11. The decoder outputs are applied via AND gates 154, and 156, OR gate 158, INVERT gate 160 and AND gate 162, to the set input terminal of an ERROR latch 164. When set, the ERROR latch energizes the ERROR lamp 166. The timing control for the error latch 164 is controlled by AND gate 170, OR gate 168, and the remaining inputs to AND gate 162.

Figure 7:
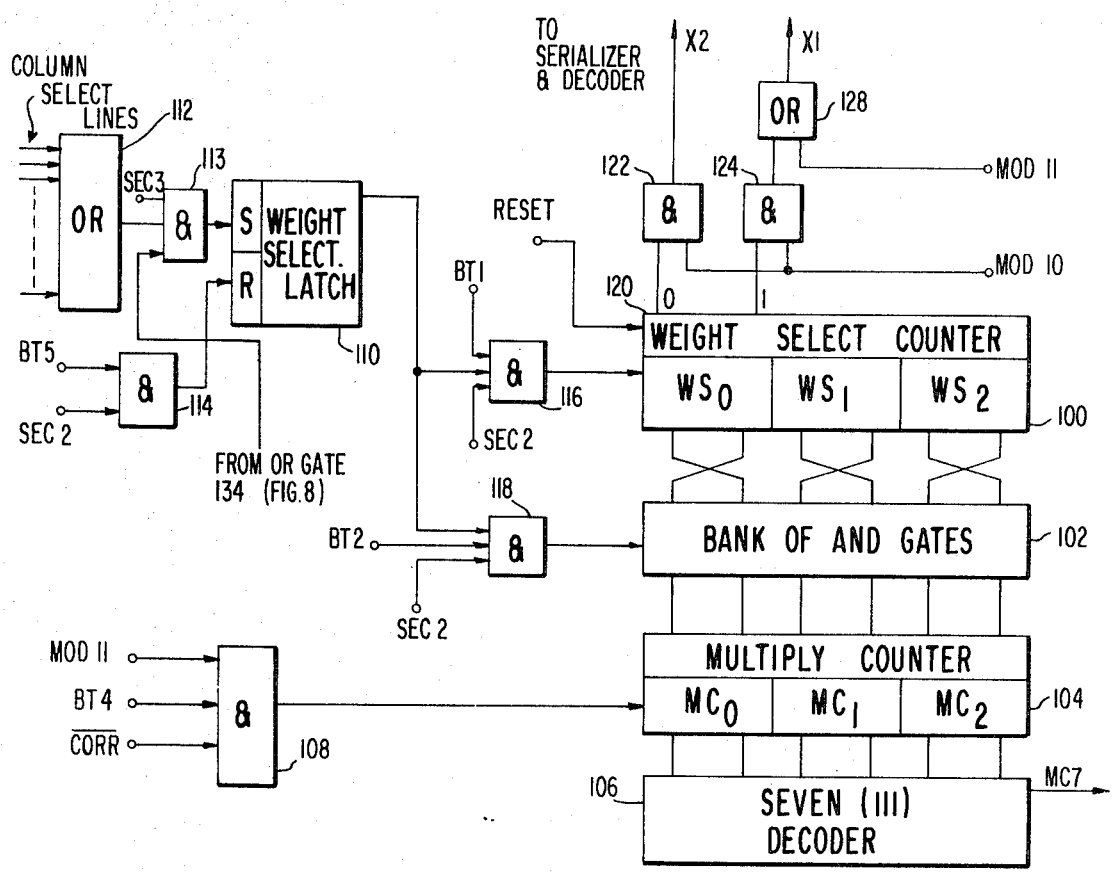

The details of the weight selector logic 18 (FIG. 1) are illustrated in FIG. 7. The input pulses on the column select lines pass through an OR gate 112 and set a WEIGHT SELECTOR latch 110 via AND gate 113. The reset time of WEIGHT SELECTOR latch 110 is controlled by AND gate 114. The output of WEIGHT SELECTOR latch 110 is applied through an AND gate 116 to a weight select counter 100 and through a second AND gate 118 to a bank of AND gates 102. The weight select counter is a binary counter having three stages and recycles to the count of 2 after reaching a count of 7. The 1 and 0 output terminals from the first stage of the weight select counter 100 are applied to AND gates 122 and 124, and OR gate 128, to generate the x1 and x2 control signals which are applied to the serializer and decoder (FIG. 5). At a time controlled by AND gate 118, the contents of the weight select counter 100 are entered into a 3-stage multiply counter 104 via the bank of AND gates 102. By inverting the output lines of the weight select counter 100, the binary number entered into multiply counter 104 is the seven's compliment of the binary number contained in weight select counter 100. The multiply counter 104 is advanced in response to output pulses from AND gate 108, and when the multiply counter reaches a binary count of 7, a 7 decoder 106 provides an output MC7.

Figure 8:
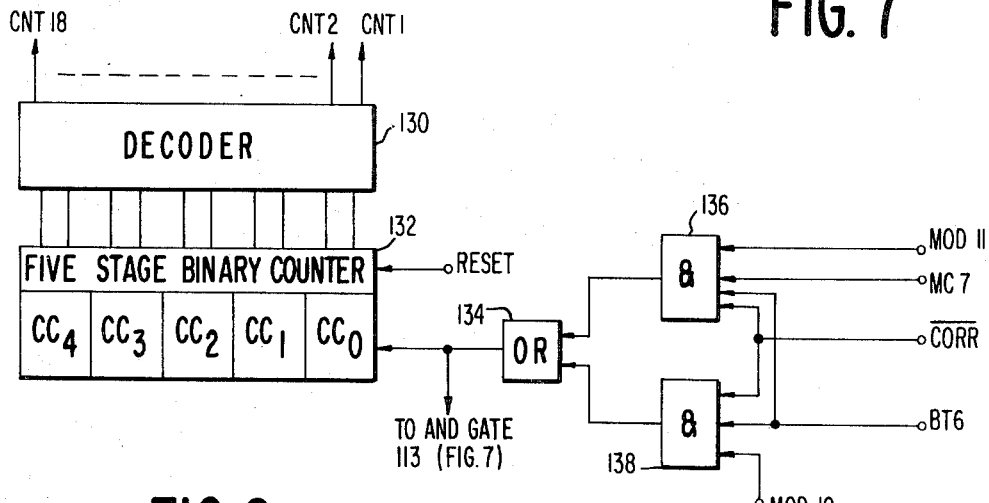

The column counter 10 (FIG. 1) and its control circuitry is shown in detail in FIG. 8. It comprises a 5-stage binary counter 132 which recycles at a count of 18 and a decimal decoder 130 which converts the binary value presently in the counter 132 into a decimal value, thereby providing output pulses sequentially on the output lines CNT1 through CNT18. The input pulses to the binary counter 132 are controlled by AND gates 136 and 138, and OR gate 134.

The operation of the detailed logic of FIGS. 6, 7 and 8 will now be explained. At start time, a reset input is applied to the accumulation shift register 144, the binary counter or column counter 132, and the weight select counter 100. The accumulation register is reset to zero, the binary counter 132 is reset to zero and the weight select counter is reset to zero. If mod 10 operation is to be performed, there is a mod 10 control input applied to the logic, and if the system is to perform the mod 11 operation, there is a mod 11 input applied to the logic. When a column select line is energized, an output pulse appears upon the digit line corresponding to the keyed-in digit in the selected column (FIG. 5). The 4-bit binary value to be accumulated is applied respectively to AND gates 90 or AND gates 88. At time BT1, the lowest order bit is applied to the Y input terminal of full adder 142 via OR gate 140. At times BT2, BT3 and BT4, the second, third and fourth order bits of the binary number respectively are applied through OR gate 140 to the Y input of full adder 142.

Also, at time BT1 the zero order bit held in the shift register 144 is applied to the X input terminal of full adder 142 via AND gate 146. Sometime during time BT1, the full adder 142 will provide a sum bit output in response to the input bits at the X, Y, and $C_{in}$ input terminals. The sum bit is shifted into the $A_3$ of register 144 in response to a shift input pulse which occurs at time BT2 SEC1. Note that the entire contents of shift register 144 is shifted to the right. Also, at time BT2 SEC1 the carryover output $C_0$ from the full adder 142 is entered into the 1-bit register 200. Thus, during time BT2, the full adder 142 receives new bit inputs at the X and Y input terminals and receives the carryover bit from the addition performed during time BT1. The same operation occurs during times BT3 and BT4 with the total result being that a 4-bit binary number serially entered into the Y input terminal of the full adder via OR gate 140 is added to the 4-bit sum which was stored in the accumulation register 144, and the new sum is now stored in the accumulation register 144. Note that the last step of this summation occurs at time BT5 SEC1. At that time, the highest order bit of the last full summation is entered into the 4-stage shift register.

During time BT4, the full adder 142 adds the highest order binary bits from the input number and the previously stored number. If this addition results in a carryover output, $C_0$ it means that the summation operation resulted in an output sum which is 16 or greater. Since only 4 stages are used in the shift register 144, the stored value can never be greater than 15. A carryover during the addition of the highest order bit corresponds to the decimal number 16. Compensation is provided by dropping the carryover when it occurs (this is equivalent to subtracting the decimal value 16 from the output sum) and adding a number corresponding to the decimal value 6 to the present contents of the accumulation register 144. Note that −16+6=−10, and −10 can be subtracted during the mod 10 operation without affecting the accuracy of the operation.

For mod 11 operation, the carryover output $C_0$ is dropped and a value corresponding to the decimal digit 5 is added to the present contents of the accumulation register 144. This affectively subtracts the decimal value 11 from the prior summation, and this can be done without affecting the accuracy of the mod 11 operation.

If a carryover output, $C_0$, occurs during time BT4, it will be entered into the 1-bit register 200 at time BT5 SEC1. At time BT5 SEC2 the $C_{in}$ output from the 1-bit register 200 will pass through AND gate 190 and set the CORRECT latch 188 thereby providing a CORR output therefrom. This indicates that a correction cycle is necessary. If a CORR output exists and the system is performing mod 10 operation, the AND gate 186 will be energized during the next times BT2 and BT3 so that the 4-bit binary number 0110, corresponding to the decimal number 6 is accumulated during the next bit timing cycle. It should be noted that if a correction is necessary, the column counter 10 (FIG. 1 is not advanced, and thus no new keyed digit is selected for accumulation.

If the system is performing mod 11 operation, the AND gate 182 will be energized during times BT1 and BT3 of the following cycle to cause the binary number 0101, corresponding to the decimal number 5, to be applied to the Y input of the full adder 142. The CORR output from CORRECT latch 188 is also applied as one input to AND gate 174. Thus, at time BT1 SEC2 of the correction cycle, AND gates 172 and 174 are fully energized thereby resetting the ARITH latch 178. When in the set condition the ARITH latch provides an ARITH output which is connected as one input to the AND gates 88 and 90 (FIG. 5). Thus at the very beginning of the correction cycle all of the AND gates in the weight decoder and serializer (FIG. 5) are disabled thereby preventing interference with the correction operation. When in the reset condition, the $\overline{\text{ARITH}}$ output from the ARITH latch 178 is energized providing one input to AND gate 192. At time BT5 SEC2 of the correction cycle, which occurs after the correction number has been fully accumulated, AND gate 192 is energized and the CORRECT latch 188 is reset. The $\overline{\text{CORR}}$ output from the CORRECT latch 188 prepares the AND gate 176 so that at time BT1 SEC2 of the following cycle the ARITH latch is set.

Referring to FIG. 7, it is seen that each time a new column select line is energized, an output from OR gate 112 sets the weight selector latch 110 via AND gate 113. At time BT1 SEC2, AND gate 116 provides an input pulse to the weight select counter 100 thereby causing the weight select counter 100 to advance by a count of 1. For mod 10 operation, only stage $WS_0$ of weight select counter 100 is important. In response to each column select line, the first stage outputs, which are referred to as the 0 and 1 outputs, are alternately energized. As a result of the connection of AND gates 122 and 124, the output lines $x1$ and $x2$ are energized to thereby control respectively the $x1$ and $x2$ sections of the weight decoder and serializer (FIG. 5).

For mod 11 operation, OR gate 128 will be continuously energized thereby providing an $x1$ output, and the AND gate 122 will never be fully energized, thus preventing the occurrence of an $x2$ output. At time BT2 SEC2 the AND gate 118 is energized providing an output therefrom which energizes the bank of AND gates 102 to pass the contents of weight select counter 100 into the multiply counter 104. As stated above, the output lines are inverted so that the seven's complement will be entered into the multiply counter 104. For example, assume that the weight select counter contains a count of 010, which is equivalent to the decimal value 2. This means that a weight of 2 must be applied to the digit within the selected keyboard column. This is accomplished by entering the seven's complement of the value 2 into the multiply counter 104. The value entered into multiply counter 102 will be the binary number 101 which is equivalent to the decimal number 5. The multiply counter 104 controls the number of cycles in which the selected digit value will be applied to the full adder 142 (FIG. 6). Thus, in order to effectively multiply the digit selected by the weighting factor 2, the system operates to add the digit into the full adder during 2 cycles. If the weighting factor were 3, the system would operate to add the digit to the full adder during 3 cycles, etc. Continuing with the example in which the weight select counter contains a weighting factor of 2, assume that one of the count select lines has been energized causing the digit stored in the selected column to be converted into a 4-bit binary number, and applied on a bit-by-bit basis to the AND gates 90. During the first cycle of addition, the 4-bit binary number will be entered into the full adder 142 (FIG. 6) during times BT1, BT2, BT3, and BT4. This number will be accumulated in the manner described above. At time BT4 of the first cycle AND gate 108 (FIG. 7) will be energized causing the multiply counter 104 to advance by a count of 1. The new value in the multiplied multiply counter will now be equivalent to the decimal value 6. At the end of the second addition cycle, the bit timing pulse BT4 will again energize AND gate 108 causing the multiply counter 104 to advance one count. The multiply counter 104 will now contain a count of 7 and this is detected by the 7 decoder 106 which provides an output MC7. In response to the output MC7, the column counter 10 (FIG. 1) is advanced thereby selecting a new column and a new digit to be weighted and accumulated. Thus, the apparatus shown in FIG. 7 operates during the mod 11 operation to serially add the digit from the selected column a number of times equal to the weighting factor assigned to that column.

It should be noted that one of the inputs to the AND gate 108 is the $\overline{\text{CORR}}$ input from the CORRECT latch 188 (FIG. 6). The $\overline{\text{CORR}}$ input will be energized only when the system is not executing a correction operation. However, if a correction operation is necessary and is being executed by the system, the AND gate 108 will not be energized and thus the multiply counter 104 will not be advanced. This allows the correction operation to take place without the weighting operation being affected (FIG. 8).

The column counter 10 controls the time at which a new column and its corresponding keyed-in digit is selected for weighting and accumulation. Although the column counter does not control the sequence in which the columns are selected or scanned it does control the times at which they are scanned. As indicated in FIG. 8, the column counter is sequenced at the end of every cycle unless a correction operation is to be performed or unless the system is performing mod 11 operation and the present selected keyed-in digit has not been accumulated a sufficient number of times. Thus, for mod 10 operation an advance input pulse will be applied to the binary counter 132 via AND gate 138 in combination with OR gate 134 at time BT6 provided a $\overline{\text{CORR}}$ input is present. For mod 11 operation, an advance pulse will be applied to the binary counter 132 via AND gate 136 in combination with OR gate 134 at time BT6 provided the inputs MC7 and $\overline{\text{CORR}}$ are present. The latter two inputs represent respectively the end of the weighting cycle for the prior number and the absence of a correction cycle.

After the column counter reaches a count of CNT18 and the keyed-in digit in the selected column is fully weighted and accumulated, the final accumulated sum in the accumulation register 144 (FIG. 6) is checked for its even divisibility by the number 10 (for mod 10 operation) or its even divisibility by the number 11 (for mod 11 operation). The timing of the check is controlled by AND gate 162 having inputs CNT18, BT5, SEC3, $\overline{\text{CORR}}$, and either input mod 10 or inputs mod 11 and MC7. At the time corresponding to the coincidence of the latter inputs, the AND gate 162 is prepared for passing the output from invert gate 160 to the set input terminal of the error latch 164. If the accumulator 144 contains a binary equivalent of the decimal value 10, there will be an output from the 10 decoder 152 which, for mod 10 operation passes through AND gate 156 and OR gate 158 at time BT5 SEC3. Thus, there will be no output from the invert gate 160 and the ERROR latch 164 will not be set. For mod 11 operation, if the binary value stored in the accumulation register 144 is equal to the decimal value of 11, there will be an output from the 11 decoder 150 which passes through AND gate 154 and OR gate 158 at time BT5 SEC3. Under these conditions there also will be no output from the invert gate 160 and the ERROR latch 164 will not be set. However if the final accumulated sum held in the accumulation register 114 is not equal to 10 (for the mod 10 operation) or is not equal to 11 (for the mod 11 operation) there will be not output from AND gate 168 and thus there will be an output from the invert gate 160 which passes through the AND gate 162 and sets the error latch 164. When the ERROR latch is set the ERROR lamp 166 is lit thereby indicating to the operator that he made an error in keying-in the number.

Although the apparatus described above is capable of performing the mod 10 and mod 11 operation, it is not necessary that a single electronic package be capable of performing both types of operation. Also, it is within the scope of the invention to verify numbers by other mathematical prescriptions. Even when the apparatus being capable of only performing a single mod operation, it still has a great amount of flexibility due to the inclusion of the programming means.

While the invention has been particularly shown and described with reference to a preferred embodiment thereof, it will be understood by those skilled in the art that various changes in form and details may be made therein without departing from the spirit and scope of the invention.

We claim:

1. Apparatus for verifying an information number having a plurality of digits in accordance with a mathematical prescription, said mathematical prescription being of the type having the rules:

each digit position of said information number is assigned a numerical weighting factor; each digit is mathematically operated upon by the assigned weighting factor to form a product; the products are summed modulo X; said apparatus for verifying comprising:
   a. keyboard means for storing the digits of a number entered therein in digit locations corresponding to the column position of the digits entered in said keyboard,
   b. programming means connected to said keyboard means for selecting which ones of said digit storage locations are to be read out and the scanning order in which they are to be read out,
   c. scanning means connected to said programming means for reading out the digits from said selected digit storage locations in the programmed scanning order, and
   d. means connected to said keyboard means for operating on said digits read out from said storage locations in accordance with the said mathematical prescription, independent of the positions of said selected storage locations.

2. Apparatus for verifying as claimed in claim 1 wherein said programming means comprises a programming matrix having a plurality of input terminals and output terminals and adapted to receive a programming device which interconnects said input and output terminals in a predetermined pattern, and a plurality of AND gates having their outputs connected respectively to the inputs of said programming matrix and one of their inputs to said scanning means, said output terminals of said programming matrix being connected to said keyboard.

3. The verification apparatus as claimed in claim 2 wherein said programming means further comprises mode select means for selecting for energization a group of said AND gates.

4. The apparatus for verifying as claimed in claim 3 wherein said scanning means comprises means for sequentially energizing said AND gates in said selected group of AND gates to thereby provide output signals on said output terminals of said programming matrix in accordance with the predetermined pattern of said programming device.

5. The apparatus for verifying as claimed in claim 3 wherein said mode selecting means comprises a second programming matrix having input terminals, output terminals and adapted to receive a replaceable programming device which interconnects said input and said output terminals in a predetermined pattern, means for applying checking mode input control signals to said input terminals of said second programming matrix, and means for connecting each of said output terminals of said second programming matrix to a group of said AND gates.

6. The apparatus for verifying as claimed in claim 5 wherein said scanning means comprises means for sequentially energizing said AND gates in said selected group of AND gates to thereby provide output signals on said output terminals of said programming matrix of said programming means in accordance with the predetermined pattern of said programming device.

7. An apparatus for verifying as claimed in claim 1 wherein said means for operating on said digits comprises:
   a. weight selecting means for providing a predetermined sequence of output control signals corresponding respectively to a predetermined sequence of weighting factors, said weight selecting means being advanced in response to the readout of each digit storage location;
   b. weight decoder means responsive to said output control signals from said weight selecting means for converting each digit read out of said digit storage locations into a binary number which is a function of the digit read out of said digit storage locations into a binary number which is a function of the digit read out of a digit storage location and the weighting factor corresponding to the output control signal;
   c. accumulation means for accumulating said binary numbers to form an accumulated sum; and
   d. checking means responsive to said accumulated sum for providing an error indication following the readout of all selected digit storage locations if the accumulated sum is not equal to a predetermined value.

8. The apparatus for verifying as claimed in claim 7 wherein said weight decoder comprises:
   a. a first decoder energized in response to a first control signal from said weight selecting means for decoding said digit read out of said digit locations into a four-bit binary number corresponding to said decimal digit; and
   b. second decoding means responsive to said digits read out of said digit storage location when activated by a second control signal from said weight selecting means for converting said decimal digit into a four-bit binary number, said latter four-bit binary number being dependent upon the value of said decimal digit in accordance with a predetermined tabular relationship.

9. An apparatus for verifying as claimed in claim 8 wherein said accumulator means comprises:
   a. a four-bit accumulation shift register;
   b. a full adder having X, Y, and carry-in inputs and a sum and carry-out outputs;
   c. means for applying said binary numbers serially to the Y input of said full adder;
   d. means for applying the contents of said accumulation shift register serially to the X input of said full adder;
   e. means for applying the sum output of said full adder to the input of said accumulation shift register; and
   f. means for delaying the output at said carry-out output one bit time and applying it to the carry-in input of said full adder.

10. An apparatus for verifying as claimed in claim 9 wherein said accumulator means further comprises correction means responsive to the output sum resulting from the addition of two 4-bit binary numbers in said full adder being equal to 16 or greater for blocking the last output from said carry-out terminal and adding a correction 4-bit binary number to the contents of said accumulator shift register.

11. The apparatus for verifying as claimed in claim 10 wherein said weight selecting means comprises:
   a. a binary circuit having two outputs corresponding to the first and second control outputs; and
   b. means for alternating the outputs of said binary circuit in response to the readout of a digit from each digit storage location.

12. An apparatus for verifying as claimed in claim 10 wherein said weight selecting means comprises a weight select counter, means for energizing a first control signal output, means responsive to each readout of said digit storage locations for advancing said weight select counter, a multiply counter, means for entering the seven's compliment of the value in said weight select counter into said multiply counter, means responsive to the count in said multiply counter for providing an advance scan output when the contents of said multiply counter is equal to the value 7, means responsive to the end of a 4-bit binary addition in said full adder for advancing said multiply counter, and means responsive to the end of a 4-bit binary addition in said full adder coincidence with said advance scan output for advancing said scanning means to readout the digit in said next selected storage location.

13. Apparatus for verifying as claimed in claim 10 wherein said programming means comprises a programming matrix having a plurality of input terminals and output terminals and adapted to receive a programming device which interconnects said input and output terminals in a predetermined pattern, and a plurality of AND gates having their outputs connected respectively to the inputs of said programming matrix and one of their inputs to said scanning means, said output terminals of said programming matrix being connected to said keyboard.

14. The verification apparatus as claimed in claim 13 wherein said programming means further comprises mode select means for selecting for energization of a group of said AND gates.

15. The apparatus for verifying as claimed in claim 14 wherein said scanning means comprises means for sequentially energizing said AND gates in said selected group of AND gates to thereby provide output signals on said output terminals of said programming matrix in accordance with the predetermined pattern of said programming device.

16. The apparatus for verifying as claimed in claim 14 wherein said mode selected means comprises a second programming matrix having input terminals, output terminals and adapted to receive a replaceable programming device which interconnects said input and said output terminals in a predetermined pattern, means for applying checking mode input control signals to said input terminals of said second programming matrix, and means for connecting each of said output terminals of said second programming matrix to a group of said AND gates.

17. The apparatus for verifying as claimed in claim 16 wherein said scanning means comprises means for sequentially energizing said AND gates in said selected group of AND gates to thereby provide output signals on said output terminals of said programming matrix of said programming means in accordance with the predetermined pattern of said programming device.